United States Patent
Park et al.

(10) Patent No.: US 11,571,741 B2
(45) Date of Patent: Feb. 7, 2023

(54) FUNCTIONAL SHEET MANUFACTURED THROUGH A POWDER SPRAY METHOD AND METHOD OF MANUFACTURING THE SAME

(71) Applicant: TERASYS.CO.,LTD, Uiwang-si (KR)

(72) Inventors: Jong Un Park, Yongin-si (KR); Chi Young Choi, Uiwang-si (KR)

(73) Assignee: TERASYS.CO., LTD, Uiwang-si (KR)

( * ) Notice: Subject to any disclaimer, the term of this patent is extended or adjusted under 35 U.S.C. 154(b) by 0 days.

(21) Appl. No.: 17/522,524

(22) Filed: Nov. 9, 2021

(65) Prior Publication Data
US 2022/0250143 A1 Aug. 11, 2022

(30) Foreign Application Priority Data

Feb. 9, 2021 (KR) .................. 10-2021-0017960

(51) Int. Cl.
| | |
|---|---|
| B22F 1/10 | (2022.01) |
| H01M 4/04 | (2006.01) |
| B22F 1/103 | (2022.01) |
| B22F 1/16 | (2022.01) |

(52) U.S. Cl.
CPC ............. *B22F 1/10* (2022.01); *H01M 4/0419* (2013.01); *B22F 1/103* (2022.01); *B22F 1/16* (2022.01); *B22F 2302/20* (2013.01); *B22F 2302/253* (2013.01); *B22F 2302/403* (2013.01)

(58) Field of Classification Search
CPC ............ B22F 2302/20; B22F 2302/253; B22F 2302/403; B22F 1/103; B22F 1/16; B22F 1/10; H01M 4/0419; B05B 5/03; B05B 5/0535; B05B 5/043; B05D 2401/32
See application file for complete search history.

(56) References Cited

U.S. PATENT DOCUMENTS 9,044,779 B2 * 6/2015 Thompson ............... B05D 1/36
2015/0024146 A1 1/2015 Mehlmann et al.

FOREIGN PATENT DOCUMENTS

| JP | 2000-246170 | 9/2000 |
|---|---|---|
| KR | 10-1573898 | 12/2015 |

* cited by examiner

*Primary Examiner* — Anthony J Zimmer
*Assistant Examiner* — Ricardo D Morales
(74) *Attorney, Agent, or Firm* — Kile Park Reed & Houtteman PLLC

(57) ABSTRACT

A method of manufacturing a functional sheet according to an embodiment of the present invention, comprise powdering a filler with specific functional component and a binder, charging the filler and the binder with second polarity, spraying the binder and the filler onto an upper surface of an electrode plate charged with first polarity opposite to the second polarity, heat-treating the binder and filler, pressing an upper surface of the filler with a rolling roller, and separating the binder and the filler from the electrode plate. Therefore, the method can improve functionality while reducing harmfulness by manufacturing the functional sheet using a powdered filler and binder without using an organic solvent.

6 Claims, 5 Drawing Sheets

FUNCTIONAL SHEET MANUFACTURED THROUGH A POWDER SPRAY METHOD AND METHOD OF MANUFACTURING THE SAME

CROSS REFERENCE TO RELATED APPLICATION

This application claims priority from and the benefit of Korean Patent Applications No. 10-2021-0017960, filed on Feb. 9, 2021, which is hereby incorporated by reference for all purposes as if fully set forth herein.

BACKGROUND OF THE INVENTION

Field of the Invention

The present invention relates to a functional sheet manufactured through a powder spray method capable of enhancing safety and function due to not using an organic solvent which is harmful to the human body, and a method for manufacturing the functional sheet.

Discussion of the Background

With the development of IT technology, various electronic circuits have various functions and are gradually becoming high-density, high-integration and complex. These electronic circuits react very sensitively to the external environment, and electronic devices including such electronic circuits are also required to have various functions such as heat dissipation, electromagnetic wave shielding, and insulation.

Therefore, these electronic devices protect the built-in electronic circuits using the functional sheet having various functions such as heat dissipation, electromagnetic wave shielding, and insulation described above.

The functional sheet includes a filler, a binder and an organic solvent. The filler has predetermined functional components such as heat dissipation, electromagnetic wave shielding, and insulation. The binder fixes and bonds the filler. The organic solvent helps mutual dilution between the filler and the binder.

These organic solvents are substances that dissolve other substances made of organic substances, are not soluble in water, volatilize well, have high cleaning power, and have a peculiar smell. Examples of such organic solvents include dichloromethane, TCE, PCE, and the like, which are halogen-containing material, or benzene, toluene, xylene, and phenol, which are not containing halogen group.

Therefore, in order to manufacture the functional sheet, an organic solvent should be used for mutual dilution between the filler and the binder, but these organic solvents have harmful properties to the human body.

A functional sheet containing such an organic solvent, or electronic devices containing the functional sheet may be harmful to general users using the functional sheet and the electronic devices.

Therefore, it is difficult to manufacture a functional sheet that satisfies both conditions of safety and functional improvement.

SUMMARY OF THE INVENTION

Therefore, the present invention provides a functional sheet manufactured through a powder spray method capable of enhancing safety and function due to not using an organic solvent which is harmful to the human body, and a method for manufacturing the functional sheet.

A method of manufacturing a functional sheet according to an embodiment of the present invention, comprises disposing a base film moving on an electrode plate that is charged with first polarity in the roll-to-roll device, powdering a filler and a binder having predetermined functional components, charging the filler and the binder with second polarity that is opposite to the first polarity, spraying the filler and the binder onto an upper surface of the base film, heat-treating the base film onto which the filler and the binder are sprayed to melt the binder, and supplying heat to a lower surface of the base film, and pressing the upper surface of the base film with a rolling roller.

The spraying the filler and the binder onto an upper surface of the base film, may comprise spraying the filler onto the upper surface of the base film, spraying a powder in which the filler and the binder are mixed onto the upper surface of the filler, and spraying the filler onto the upper surface of the powder in which the filler and the binder are mixed.

The above method may further comprise attaching a protection film to the lower surface of the base film.

The filler may comprise at least one of boron nitride, graphite, alumina, sandust, fullerene, and carbon nanotube (CNT).

The binder may comprise at least one of a thermoplastic resin, a polymer compound, epoxy, paraffin, urethane, and silicone.

A method of manufacturing a functional sheet according to an embodiment of the present invention, comprise powdering a filler with specific functional component and a binder, charging the filler and the binder with second polarity, spraying the binder and the filler onto an upper surface of an electrode plate charged with first polarity opposite to the second polarity, heat-treating the binder and filler, pressing an upper surface of the filler with a rolling roller, and separating the binder and the filler from the electrode plate.

The spraying the binder and the filler onto an upper surface of an electrode plate charged with first polarity opposite to the second polarity, may comprise spraying the binder over the entire upper surface of the electrode plate, and spraying different types of fillers for each predetermined region of the upper surface of the binder.

The spraying the binder and the filler onto an upper surface of an electrode plate charged with first polarity opposite to the second polarity, may comprise spraying different types of binders for each predetermined region of the upper surface of the electrode plate, and spraying different types of fillers for each predetermined area of an upper surface of the binder.

The spraying the binder and the filler onto an upper surface of an electrode plate charged with first polarity opposite to the second polarity, may comprise spraying different types of binders for each predetermined region of the upper surface of the electrode plate, and spraying one type of filler over the entire area of an upper surface of the binder.

The powdering a filler with specific functional component and a binder, may comprise powering the filler and the binder such that a particle size of the filler is larger than a particle size of the binder.

A functional sheet of an embodiment of the present invention is manufactured by one of above the method.

As described above, the functional sheet using the powder spray method, and the method for manufacturing the functional sheet according to the present invention can improve functionality while reducing harmfulness by manufacturing the functional sheet using a powdered filler and binder without using an organic solvent.

DETAILED DESCRIPTION OF THE ILLUSTRATED EMBODIMENTS

Figure 1:
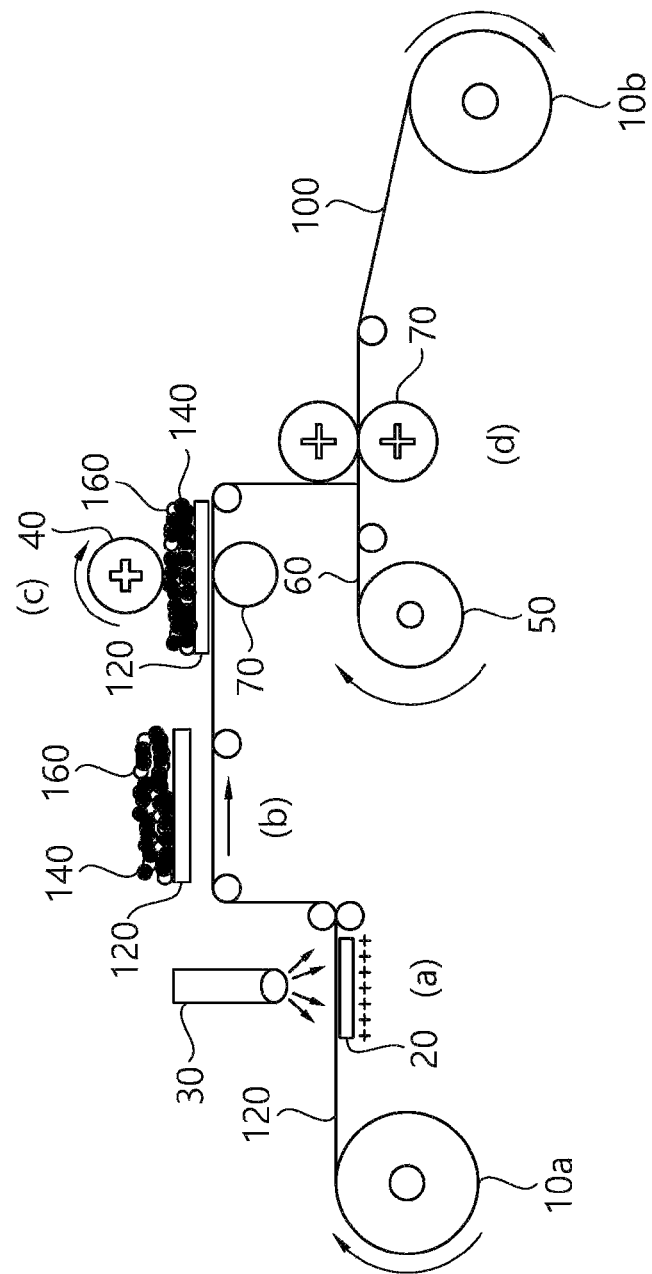
FIG. 1 is a conceptual diagram showing a method for manufacturing a functional sheet manufactured through a powder spray method according to an embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, etc. may be used herein to describe various elements, these elements should not be limited by these terms. These terms are only used to distinguish one element from another element. For example, a first element discussed below could be termed a second element, and similarly, a second element may also be termed a first element, without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a functional sheet manufactured through a powder spray method capable of enhancing safety and function due to not using an organic solvent which is harmful to the human body, and a method for manufacturing the functional sheet.

Hereinafter, referring to FIG. 1, a method of manufacturing a functional sheet through a powder spray method according to an embodiment of the present invention will be described in more detail.

FIG. 1 is a conceptual diagram showing a method for manufacturing a functional sheet manufactured through a powder spray method according to an embodiment of the present invention.

As shown in FIG. 1, according to the method of manufacturing a functional sheet using the powder spray method according to an embodiment of the present invention, a base film 120 wound on the first winding roller 10a of the roll-to-roll device is transferred to a second winding roller 10b from the first winding roller 10a.

At this time, an electrode plate 20 is positioned between the first winding roller 10a and the second winding roller 10b, and the electrode plate 10 is charged with a positive charge (+), and the base film 120 is disposed on top of the electrode plate 20.

In addition, the grinder powders the filler 140 having predetermined functional components such as heat dissipation, electromagnetic wave shielding, and insulation, and the binder 160 used for bonding between fillers, respectively.

Then, the sprayer 30 charges the powdered filler 140 and the binder 160 with a negative charge (−). In order for that, a sprayer 30 is disposed between the first winding roller 10a and the second winding roller 10b. A high voltage, atomizing air, and ions are supplied to the sprayer 30, and a filler 140 and a binder 160 are injected, so that the filler 140 and the binder 160 are negatively charged. In this case, the filler 140 used may include at least one of boron nitride, graphite, alumina, sandust, fullerene, and carbon nanotube (CNT). In addition, the binder 160 may include at least one of a thermoplastic resin, a polymer compound, epoxy, paraffin, urethane, and silicone.

Accordingly, as shown a section (a) in FIG. 1, the filler 140 and the binder 160 negatively charged in the sprayer 30 through the needle electrode formed at the end of the sprayer 30 is sprayed on the upper surface of the base film 120.

At this time, since the positively charged electrode plate 20 is located under the base film 120, the filler 140 and the binder 160 injected onto the upper surface of the base film 120 adhere to the upper surface of the base film 120 by through the electrode plate 20.

In this way, the base film 120 with the filler 140 and the binder 160 moves in the direction of the second winding roller 10b by a predetermined distance.

Thereafter, as shown in a section (b) in FIG. 1, a heating unit (not shown) heats the base film 120 to which the filler 140 and the binder 160 are bonded to partially melt the binder 160. For example, the heat provided to the base film 120 may be about 160° C. to 180° C. This heat is a temperature for melting the binder 160 bonded to the base film 120, and the range of the heat temperature may also vary depending on the type of the binder 160 actually used.

Then, when the binder 160 bonded to the base film 120 is partially melted, the base film 120 moves again in the direction of the second winding roller 10b by a predetermined distance.

Then, as shown in a section (c) in FIG. 1, a heating roller 70 supplies heat to the lower surface of the base film 120, and at the same time the rolling roller 40 presses an upper surface of the base film 120 to manufacture the functional sheet 100. In particular, as the rolling roller 40 presses the upper surface of the base film 120 on which the binder 160 is partially melted in the previous step, the fillers adhere more closely to each other on the base film 120. Therefore, the functional sheet 100 prepared in this way may have the improved functionality through the fillers 140 adhere to each other.

In addition, as shown in a section (d) in FIG. 1, in order to protect the functional sheet 100 from external hazards such as foreign substances, a protection film 60 wound on an auxiliary roller 20 disposed between the first winding roller 10a and the second wining roller 10b is transferred toward the second winding roller 10b so that the protection film 60 may adhere to a lower surface of the functional sheet 100 (or a lower surface of the base film 120. At this time, a pair of heating rollers 70 are respectively disposed on the upper and lower portions with the base film 120 between the auxiliary roller 50 and the second winding roller 10b. Therefore, since the heating rollers 70 apply heat of about 50° C. to 70° C. to the lower part of the base film 120 in the attachment process between the base film 120 and the protection film 60, the combination of the protection film 120 and the functional sheet 100 can be further strengthened. The protection film 60 may be, for example, a PET (polyethylene terephthalate) film. As such, since the protection film 60 is attached to the functional sheet 100, it is possible to prevent contamination of the functional sheet 100 from external risk factors.

In addition, in the step of spraying the filler 140 and the binder 160 onto the base film 120 described above with reference to in a section (a) in FIG. 1, the filler and the binder may be sprayed in various forms.

In the step of spraying the filler 140 and the binder 160 onto the base film 120 as explained with reference to in a section (a) in FIG. 1, after the sprayer powders the filler and binder and negatively charges, the filler 140 and the binder 160 are simultaneously sprayed, but the filler 140 and the binder 160 may be sprayed on the base film 120 in a predetermined order.

Figure 2:
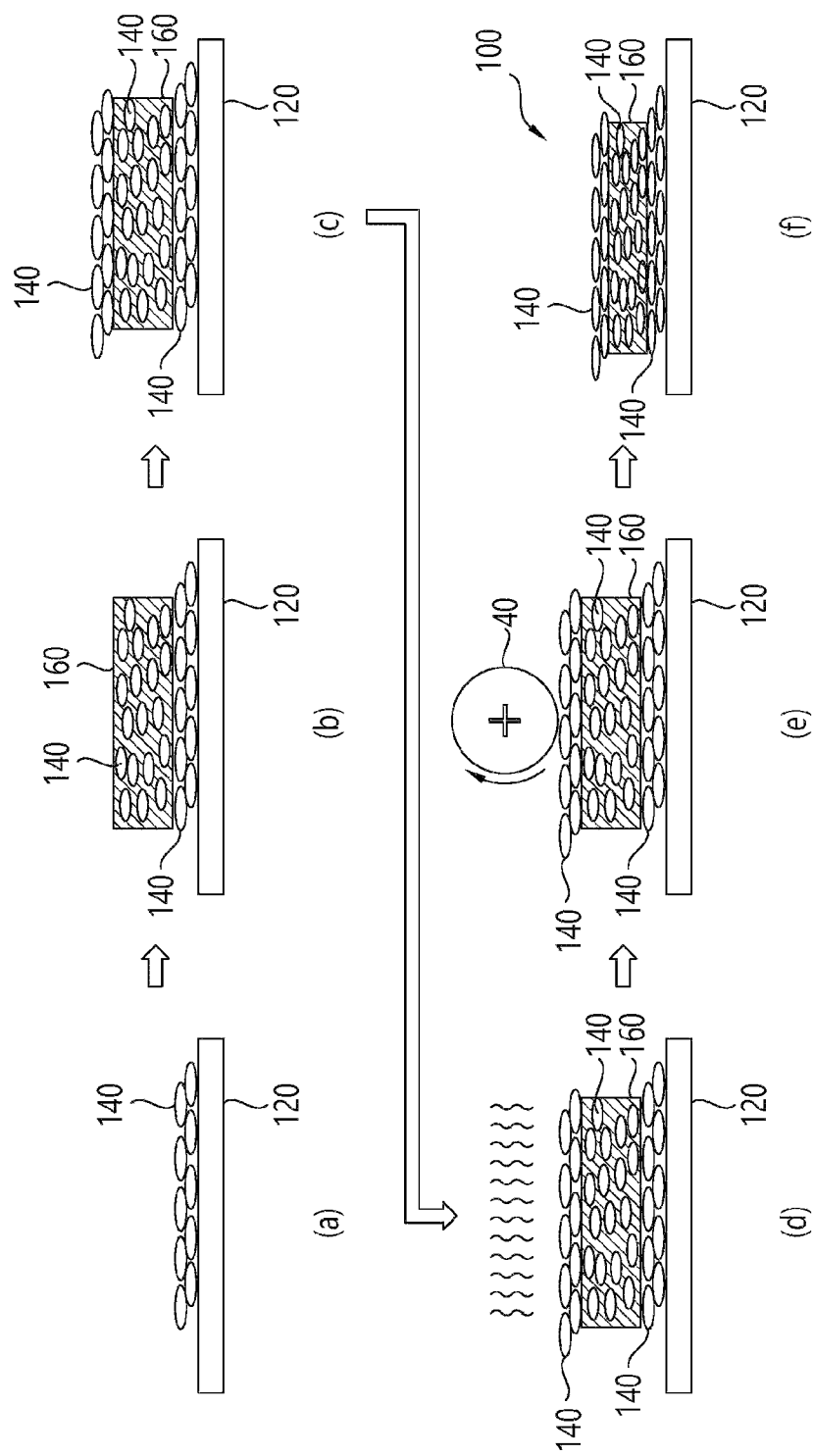
FIG. 2 is a conceptual diagram showing a method of manufacturing a functional sheet manufactured through a powder spray method according to another embodiment of the present invention.

FIG. 2 is a conceptual diagram showing a method of manufacturing a functional sheet manufactured through a powder spray method according to another embodiment of the present invention.

First, as shown in a section (a) in FIG. 2, only the filler 140 that is powdered and negatively charged is sprayed onto the base film 120 through a sprayer. Thereafter, as shown in a section (b) in FIG. 2, the filler 140 and the binder 160 are powdered in a mixed state and negatively charged through the sprayer 30, and sprayed onto the upper surface of the base film 120 onto which the filler 140 that is powered sprayed first.

Then, as shown in a section (c) in FIG. 2, the filler 140 that is negatively charged is sprayed again onto the upper surface of the base film 120 through the sprayer.

That is, it can be seen that the filler 140, the filler 140 and the binder 160 mixture, and the filler 140 are sequentially applied onto the base film 120.

Then, as shown a section (d) in FIG. 2, through heating the base film 120 by a heating unit to a temperature of about 80° C. to 180° C., a portion of the binder 160 applied onto the base film 120 is melted.

In addition, as shown in a section (e) in FIG. 2, as the rolling roller 40 presses the upper surface of the base film 120 on which the binder 160 is melted, the fillers 140 applied onto the base film 120 are more closely adhered to each other as shown in a section (f) in FIG. 2, so that the functional sheet 100 having high functionality may be manufactured.

So far, a method for manufacturing a functional sheet by using a base film as a substrate has been described. Hereinafter, a method for manufacturing a functional sheet using only a filler and a binder without using a base film will be described.

Figure 3:
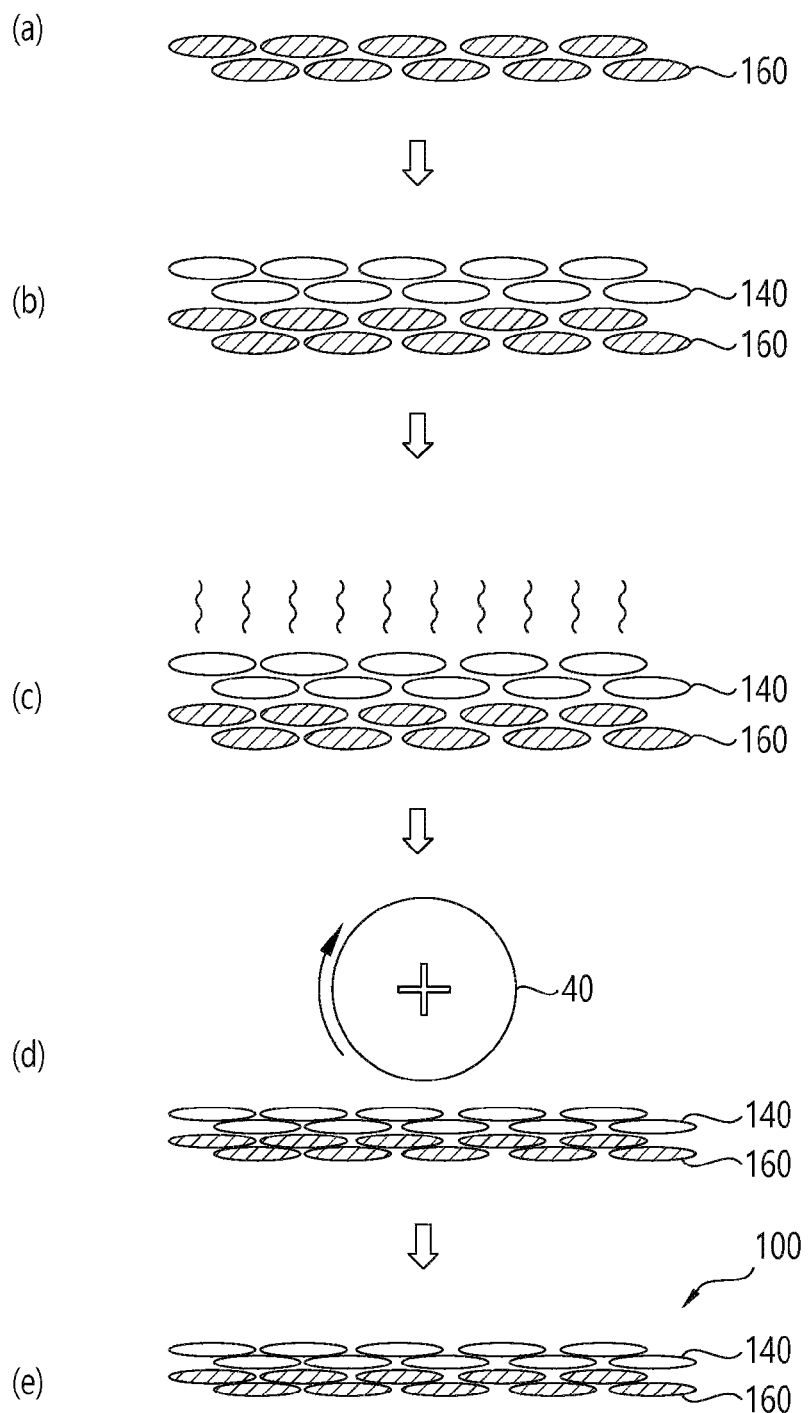
FIG. 3 is a conceptual diagram showing a method of manufacturing a functional sheet manufactured through a powder spray method according to another embodiment of the present invention.

FIG. 3 is a conceptual diagram showing a method of manufacturing a functional sheet manufactured through a powder spray method according to another embodiment of the present invention.

The grinder powders the filler 140 and the binder 160 having predetermined functional components.

The sprayer charges the powdered filler 140 and binder 160 with negative charges.

Thereafter, as shown in a section (a) in FIG. 3, the binder 160 is sprayed first onto the upper surface of the positively charged electrode plate 20 through the sprayer.

Subsequently, as shown in a section (b) in FIG. 3, the filler 140 negatively charged is sprayed onto the binder 160 through the sprayer.

Thereafter, as shown in a section (c) in FIG. 3, a heating unit supplies heat to the binder 160 and the filler 140 to melt a portion of the binder 160.

Then, as shown in a section (d) in FIG. 3, the rolling roller 40 presses the upper surface of the filler 40. That is, as the space formed by melting a portion of the binder 160 is pressed by the rolling roller 40, the fillers 140 are more closely adhered.

Thereafter, when the binder 160 and the filler 140 are separated from the electrode plate 20, the functional sheet 100 in which the filler 140 is in close contact with each other on the binder 160 can be manufactured as shown in a section (e) in FIG. 3.

In particular, when a binder is used as a substrate without using a base film, more various types of functional sheets can be manufactured.

Hereinafter, with reference to FIG. 4, a functional sheet using various types of binders and fillers will be described.

Figure 4:
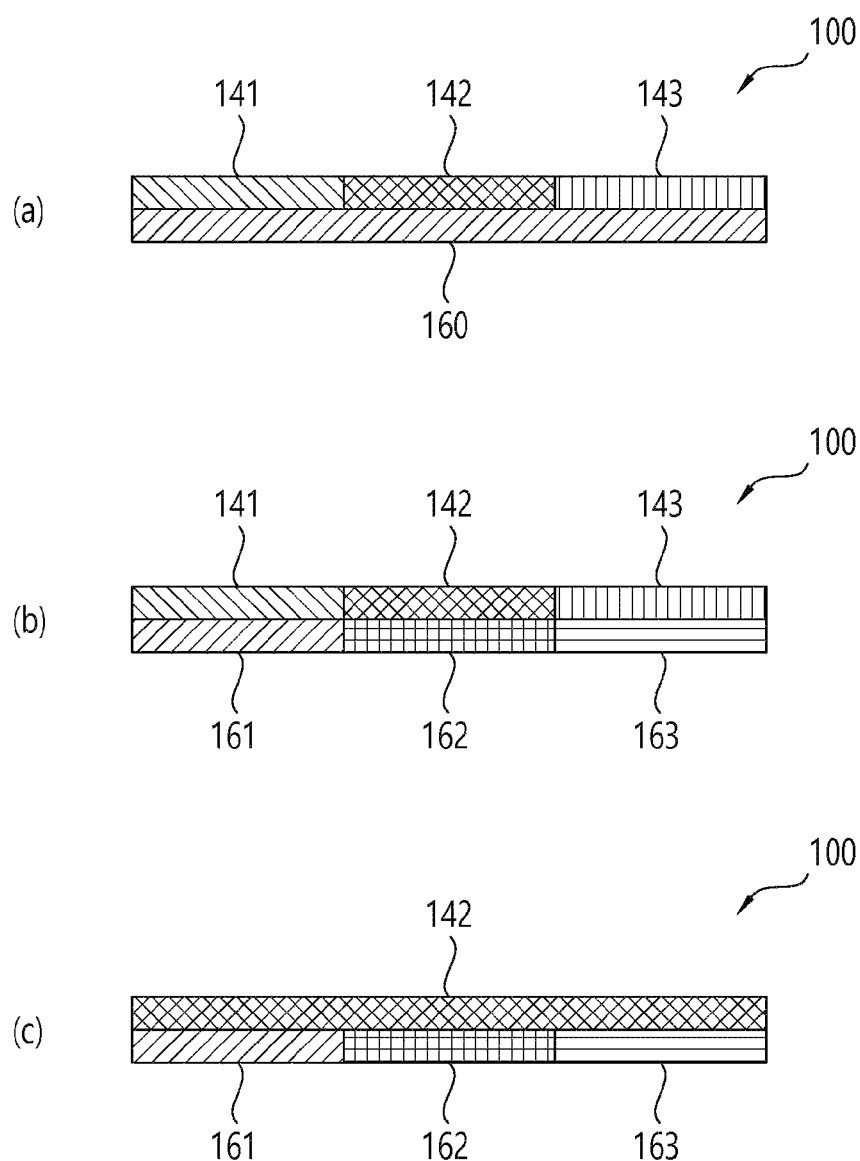
FIG. 4 is a cross-sectional view showing a functional sheet manufactured through a powder spray method according to another embodiment of the present invention.

FIG. 4 is a cross-sectional view showing a functional sheet manufactured through a powder spray method according to another embodiment of the present invention.

First, in the functional sheet 100 illustrated in a section (a) in FIG. 4, different types of fillers 141, 142, and 143 may be included on a binder 160.

In addition, a sprayer sprays the binder over the entire area of the upper surface of the electrode plate that is positively charged.

Then, the sprayer sprays different types of fillers 141, 142, 143 onto respective regions on the binder, respectively. In this case, the respective regions to which the fillers 141, 142, and 143 are sprayed, respectively may be easily changed according to a function requested for each position.

Accordingly, in the functional sheet 100 prepared in this way, different fillers 141, 142, and 143 are applied to respective regions, so that one functional sheet can implement various functions.

In addition, the functional sheet 100 shown in a section (b) in FIG. 4 may use various types of binders 161, 162, and 163 as well as fillers.

According to this functional sheet 100, the upper surface of the positively charged electrode plate 20 is preset for respective regions, and different types of binders 161, 162, 163 which are powdered and negatively charged, are sprayed onto the respective regions through a sprayer.

In this way, different types of fillers 141, 142, and 143 are sprayed onto the binders 161, 162, 163 that are sprayed with different types through the sprayer for respective regions.

Therefore, it is possible to manufacture a functional sheet containing different types of binders and fillers at once.

As such, when different types of binders are used, one type of binder may be used for dispersing the filler, and another type of binder may be used for fixing and bonding the fillers.

Alternatively, as shown in a section (c) in FIG. 4, while one functional sheet may include only one type of filler, while using several types of binders as a substrate.

In this case, the upper surface of the positively charged electrode plate 20 is set in advance for respective regions, and different types of binders 161, 162, and 163 that are powdered and are negatively charged are respectively is sprayed through a sprayer.

At this time, one type of filler 142 is sprayed onto the entire upper regions of each of the binders 161, 162, and 163 by the sprayer.

In this way, the functional sheet can be manufactured without using a base film. At this time, in order to increase the durability of the functional sheet, the particle sizes between the powdered filler and the binder may be different from each other.

For example, when the grinder powders the filler and the binder, the particle size of the filler 140 having a predetermined functional component may be formed to be larger than the particle size of the binder 160. In this case, the particle size of the filler 140 and the binder 160 is about 10 to 100 microns, and there may be a size difference within this range.

That is, the negatively charged filler 140 having relatively large particles are sprayed on the upper surface of the positively charged electrode plate from the sprayer.

Then, the binder 160 having relatively small particles and negatively charged is sprayed onto the upper surface of the filler by the sprayer.

Figure 5:
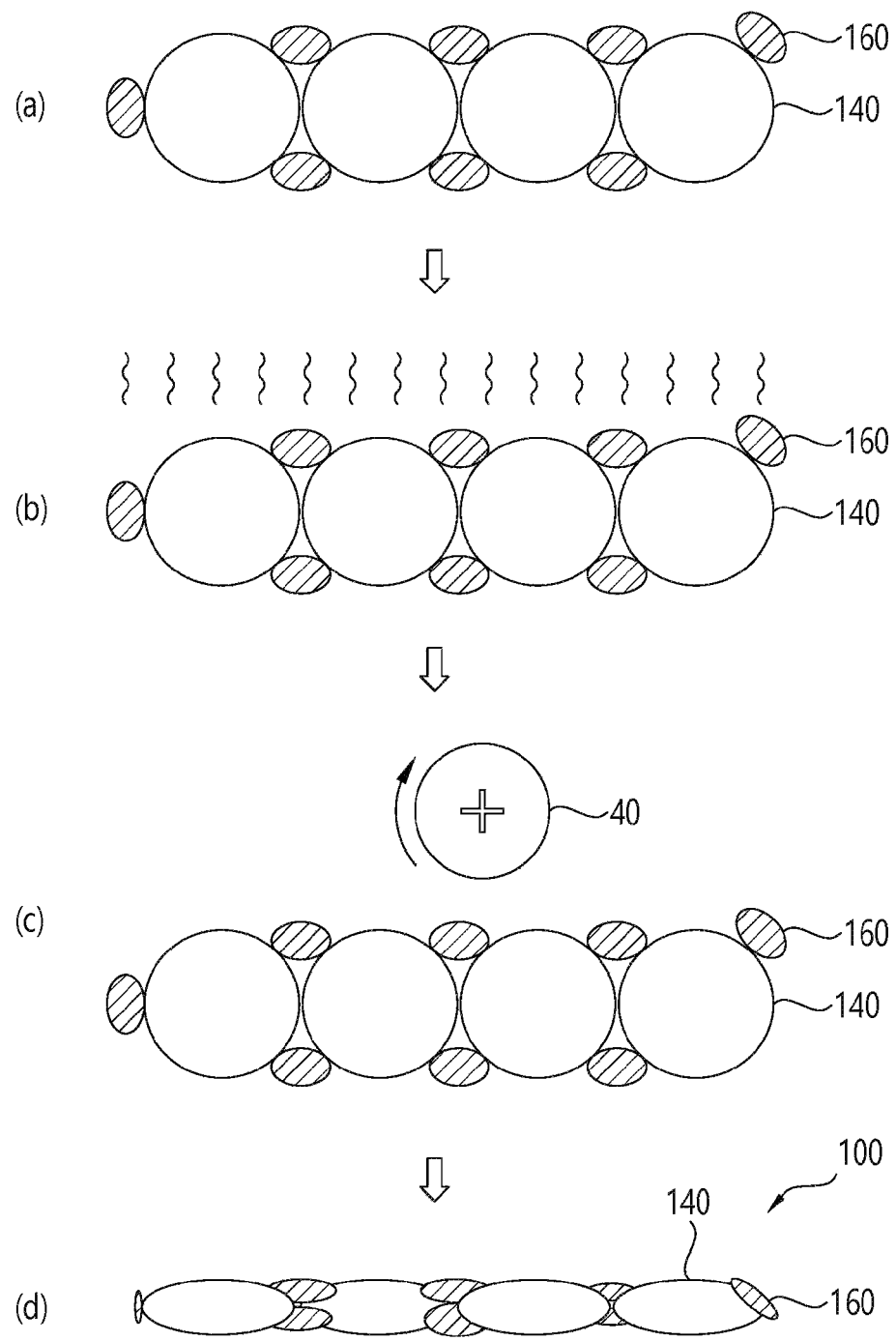
FIG. 5 is a conceptual diagram showing a method of manufacturing a functional sheet manufactured through a powder spray method according to another embodiment of the present invention.

At this time, as shown in a section (a) in FIG. 5, due to the relative particle size difference between the filler 140 and the binder 160, the binders 160 with relatively small particle size may fill each empty space between the fillers 140 with relatively large particle sizes.

Thereafter, as shown in a section (b0 in FIG. 5, when the heating unit heats the filler 140 and the binder 160, a portion of the binder 160 is melted.

At this time, as shown in a section (c) in FIG. 5, when the rolling roller 40 presses the upper surfaces of the filler 140 and the binder 160, a functional sheet, in which the fillers 140 are tightly combined and the binders 160 fill the empty space between the fillers 140, may be manufactured as shown in section (d) in FIG. 5.

Therefore, as the fillers 140 having predetermined functional components in the functional sheet 100 are in close contact with each other, the functions of the filler 140 are further enhanced, and the overall thickness of the sheet is also reduced, resulting in miniaturization, so that a functional sheet that can be easily used in small sized electronic devices can be manufactured.

As described above, the functional sheet manufactured through the powder spray method and the method for manufacturing the functional sheet according to the present invention can improve functionality while reducing harmfulness by manufacturing the functional sheet using a powdered filler and binder without using an organic solvent.

Hereinbefore, the electrode plate 20 is positively charged and the filler 140 and the binder 160 are negatively charged. However, the electrode plate 20 may be negatively charged and the filler 140 and the binder 160 may be positively charged.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a functional sheet, comprising:
    disposing a base film moving on an electrode plate that is charged with positive polarity in a roll-to-roll device;
    powdering a filler having functional components;
    bonding via a binder configured to bond between the functional components;
    charging the filler and the binder with negative polarity;
    spraying the filler and the binder onto an upper surface of the base film;
    heat-treating the base film onto which the filler and the binder are sprayed corresponding to a melting temperature of the binder to melt the binder; and
    supplying heat to a lower surface of the base film, and pressing the upper surface of the base film with a rolling roller,
    wherein spraying the filler and the binder onto an upper surface of the base film, comprises:
    spraying the filler onto the upper surface of the base film;
    spraying a powder in which the filler and the binder are mixed onto the upper surface of the filler; and
    spraying the filler onto the upper surface of the powder in which the filler and the binder are mixed.

2. The method of claim 1, further comprising:
    attaching a protection film to the lower surface of the base film to manufacture a functional sheet.

3. The method of claim 1, wherein the filler comprises at least one of boron nitride, graphite, alumina, sandust, fullerene, and carbon nanotube (CNT).

4. The method of claim 1, wherein the binder comprises at least one of a thermoplastic resin, a polymer compound, epoxy, paraffin, urethane, and silicone.

5. A method of manufacturing a functional sheet, comprising:
    powdering a filler with a functional component;
    bonding via a binder configured to bond between the functional component;
    charging the filler and the binder with negative polarity;
    spraying the binder and the filler onto an upper surface of an electrode plate charged with positive polarity;
    heat-treating the binder and filler corresponding to a melting temperature of the binder to melt the binder;
    pressing an upper surface of the filler with a rolling roller; and
    separating the binder and the filler from the electrode plate to manufacture a functional sheet,
    wherein spraying the binder and the filler onto an upper surface of an electrode plate charged with first polarity opposite to the second polarity, comprises:
    spraying the binder over the entire upper surface of the electrode plate; and
    spraying different types of fillers for a region of the upper surface of the binder, or, spraying different types of binders for a region of the upper surface of the electrode plate; and spraying different types of fillers for an area of an upper surface of the binder, or, spraying different types of binders for the region of the upper surface of the electrode plate; and spraying one type of filler over the entire area of an upper surface of the binder.

6. The method of claim 5, wherein powdering a filler with a functional component and a binder, comprises:

powdering the filler and the binder such that a particle size of the filler is larger than a particle size of the binder.

* * * * *